United States Patent
Wilson et al.

(10) Patent No.: US 10,042,919 B2
(45) Date of Patent: Aug. 7, 2018

(54) USING DISTINGUISHING PROPERTIES TO CLASSIFY MESSAGES

(71) Applicant: SONICWALL US HOLDINGS INC., Milpitas, CA (US)

(72) Inventors: Brian K. Wilson, Palo Alto, CA (US); David A. Koblas, Los Altos, CA (US); Arno A. Penzias, San Francisco, CA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

(21) Appl. No.: 15/385,399

(22) Filed: Dec. 20, 2016

(65) Prior Publication Data

US 2017/0103120 A1    Apr. 13, 2017

Related U.S. Application Data

(63) Continuation of application No. 14/938,573, filed on Nov. 11, 2015, now Pat. No. 9,524,334, which is a continuation of application No. 13/912,055, filed on Jun. 6, 2013, now Pat. No. 9,189,516, which is a continuation of application No. 13/015,526, filed on Jan. 27, 2011, now Pat. No. 8,484,301, which is a continuation of application No. 11/926,819, filed on Oct. 29, 2007, now Pat. No. 7,882,189, which is a continuation of application No. 10/371,987, filed on Feb. 20, 2003, now Pat. No. 8,266,215.

(51) Int. Cl.
*G06F 15/16* (2006.01)
*G06F 17/30* (2006.01)
*H04L 12/58* (2006.01)

(52) U.S. Cl.
CPC .. *G06F 17/30598* (2013.01); *G06F 17/30424* (2013.01); *G06F 17/30867* (2013.01); *H04L 51/00* (2013.01); *H04L 51/12* (2013.01)

(58) Field of Classification Search
CPC ......... G06F 17/30598; G06F 17/30424; H04L 51/12
USPC ........................................ 709/203, 206, 207
See application file for complete search history.

(56) References Cited

U.S. PATENT DOCUMENTS

| | | |
|---|---|---|
| 5,905,777 A | 5/1999 | Foladare et al. |
| 5,960,383 A | 9/1999 | Fleischer |
| 5,999,929 A | 12/1999 | Goodman |
| 6,023,723 A | 2/2000 | McCormick et al. |
| 6,052,709 A | 4/2000 | Paul |
| 6,072,942 A | 6/2000 | Stockwell et al. |
| 6,076,101 A | 6/2000 | Kamakura et al. |

(Continued)

FOREIGN PATENT DOCUMENTS

WO    WO 2004/075029    9/2004

OTHER PUBLICATIONS

U.S. Appl. No. 15/074,788 Final Office Action dated Mar. 18, 2016.

(Continued)

*Primary Examiner* — Thu Ha Nguyen
(74) *Attorney, Agent, or Firm* — Polsinelli LLP

(57) ABSTRACT

A system and method are disclosed for classifying a message. The method includes receiving the message, identifying in the message a distinguishing property; generating a signature using the distinguishing property; and comparing the signature to a database of signatures generated by previously classified messages.

20 Claims, 5 Drawing Sheets

(56) References Cited

U.S. PATENT DOCUMENTS

| | | | |
|---|---|---|---|
| 6,112,227 A | 8/2000 | Heiner | |
| 6,161,130 A | 12/2000 | Horvitz et al. | |
| 6,199,102 B1 | 3/2001 | Cobb | |
| 6,222,942 B1 | 4/2001 | Martin | |
| 6,234,802 B1 | 5/2001 | Pella et al. | |
| 6,266,692 B1 | 7/2001 | Greenstein | |
| 6,330,590 B1 | 12/2001 | Cotton | |
| 6,373,985 B1 | 4/2002 | Hu et al. | |
| 6,421,709 B1 | 7/2002 | McCormick et al. | |
| 6,424,997 B1 | 7/2002 | Buskirk, Jr. et al. | |
| 6,438,690 B1 | 8/2002 | Patel et al. | |
| 6,453,327 B1 | 9/2002 | Nielsen | |
| 6,539,092 B1 | 3/2003 | Kocher | |
| 6,546,416 B1 | 4/2003 | Kirsch | |
| 6,549,957 B1 | 4/2003 | Hanson et al. | |
| 6,591,291 B1 | 7/2003 | Gabber et al. | |
| 6,615,242 B1 | 9/2003 | Riemers | |
| 6,615,348 B1 | 9/2003 | Gibbs | |
| 6,621,930 B1 | 9/2003 | Smadja | |
| 6,640,301 B1 | 10/2003 | Ng | |
| 6,643,686 B1 | 11/2003 | Hall | |
| 6,650,890 B1 | 11/2003 | Irlam et al. | |
| 6,654,787 B1 | 11/2003 | Aronson et al. | |
| 6,691,156 B1 | 2/2004 | Drummond et al. | |
| 6,708,205 B2 | 3/2004 | Sheldon et al. | |
| 6,728,378 B2 | 4/2004 | Garib | |
| 6,732,149 B1 | 5/2004 | Kephart | |
| 6,772,196 B1 | 8/2004 | Kirsch et al. | |
| 6,778,941 B1 | 8/2004 | Worrell et al. | |
| 6,779,021 B1 | 8/2004 | Bates et al. | |
| 6,816,884 B1 | 11/2004 | Summers | |
| 6,829,635 B1 | 12/2004 | Townsend | |
| 6,842,773 B1 | 1/2005 | Ralston et al. | |
| 6,851,051 B1 | 2/2005 | Bolle et al. | |
| 6,868,498 B1 | 3/2005 | Katsikas | |
| 6,876,977 B1 | 4/2005 | Marks | |
| 6,931,433 B1 | 8/2005 | Ralston et al. | |
| 6,941,348 B2 | 9/2005 | Petry et al. | |
| 6,944,772 B2 | 9/2005 | Dozortsev | |
| 6,952,719 B1 | 10/2005 | Harris | |
| 6,963,928 B1 | 11/2005 | Bagley et al. | |
| 6,965,919 B1 | 11/2005 | Woods et al. | |
| 7,003,555 B1 | 2/2006 | Jungck | |
| 7,003,724 B2 | 2/2006 | Newman | |
| 7,006,993 B1 | 2/2006 | Cheong et al. | |
| 7,016,875 B1 | 3/2006 | Steele et al. | |
| 7,016,877 B1 | 3/2006 | Steele et al. | |
| 7,032,114 B1 | 4/2006 | Moran | |
| 7,072,942 B1 | 7/2006 | Mailer | |
| 7,076,241 B1 | 7/2006 | Zondervan | |
| 7,103,599 B2 | 9/2006 | Buford et al. | |
| 7,117,358 B2 | 10/2006 | Bandini et al. | |
| 7,127,405 B1 | 10/2006 | Frank et al. | |
| 7,149,778 B1 | 12/2006 | Patel et al. | |
| 7,162,413 B1 | 1/2007 | Johnson et al. | |
| 7,171,450 B2 | 1/2007 | Wallace et al. | |
| 7,178,099 B2 | 2/2007 | Meyer et al. | |
| 7,206,814 B2 | 4/2007 | Kirsch | |
| 7,216,233 B1 | 5/2007 | Krueger | |
| 7,222,157 B1 | 5/2007 | Sutton, Jr. et al. | |
| 7,231,428 B2 | 6/2007 | Teague | |
| 7,249,175 B1 | 7/2007 | Donaldson | |
| 7,293,063 B1 | 11/2007 | Sobel | |
| 7,299,261 B1 | 11/2007 | Oliver et al. | |
| 7,366,919 B1 | 4/2008 | Sobel et al. | |
| 7,392,280 B2 | 6/2008 | Rohall et al. | |
| 7,406,502 B1 | 7/2008 | Oliver et al. | |
| 7,472,163 B1 | 12/2008 | Ben-Yoseph et al. | |
| 7,539,726 B1 | 5/2009 | Wilson et al. | |
| 7,562,122 B2 | 7/2009 | Oliver et al. | |
| 7,580,982 B2 | 8/2009 | Owen et al. | |
| 7,693,945 B1 | 4/2010 | Dulitz et al. | |
| 7,711,669 B1 | 5/2010 | Liu et al. | |
| 7,711,786 B2 | 5/2010 | Zhu | |
| 7,725,475 B1 * | 5/2010 | Alspector | H04L 12/585 707/758 |
| 7,725,544 B2 | 5/2010 | Alspector et al. | |
| 7,827,190 B2 | 11/2010 | Pandya | |
| 7,836,061 B1 | 11/2010 | Zorky | |
| 7,873,996 B1 | 1/2011 | Emigh et al. | |
| 7,877,807 B2 | 1/2011 | Shipp | |
| 7,882,189 B2 * | 2/2011 | Wilson | H04L 51/12 379/93.01 |
| 8,010,614 B1 | 8/2011 | Musat et al. | |
| 8,046,832 B2 | 10/2011 | Goodman et al. | |
| 8,091,129 B1 | 1/2012 | Emigh et al. | |
| 8,108,477 B2 | 1/2012 | Oliver et al. | |
| 8,112,486 B2 | 2/2012 | Oliver et al. | |
| 8,180,837 B2 | 5/2012 | Lu et al. | |
| 8,255,393 B1 | 8/2012 | Yu et al. | |
| 8,260,914 B1 | 9/2012 | Ranjan | |
| 8,266,215 B2 | 9/2012 | Wilson | |
| 8,271,603 B2 | 9/2012 | Wilson | |
| 8,463,861 B2 | 6/2013 | Oliver et al. | |
| 8,484,301 B2 | 7/2013 | Wilson | |
| 8,515,894 B2 | 8/2013 | Yu | |
| 8,688,794 B2 | 4/2014 | Oliver | |
| 8,713,014 B1 | 4/2014 | Alspector et al. | |
| 8,738,721 B1 * | 5/2014 | Smirnov | G06Q 10/107 709/206 |
| 8,918,466 B2 | 12/2014 | Yu | |
| 8,935,348 B2 | 1/2015 | Oliver | |
| 9,177,293 B1 * | 11/2015 | Gagnon | G06Q 10/107 |
| 9,189,516 B2 | 11/2015 | Wilson | |
| 9,325,649 B2 | 4/2016 | Oliver | |
| 9,465,789 B1 | 10/2016 | Chen et al. | |
| 9,524,334 B2 | 12/2016 | Wilson | |
| 2001/0002469 A1 | 5/2001 | Bates et al. | |
| 2001/0044803 A1 | 11/2001 | Szutu | |
| 2001/0047391 A1 | 11/2001 | Szutu | |
| 2002/0004899 A1 | 1/2002 | Azuma | |
| 2002/0016735 A1 * | 2/2002 | Runge | G06Q 10/107 705/14.49 |
| 2002/0046275 A1 | 4/2002 | Crosbie et al. | |
| 2002/0052920 A1 | 5/2002 | Umeki et al. | |
| 2002/0052921 A1 | 5/2002 | Morkel | |
| 2002/0087573 A1 | 7/2002 | Reuning et al. | |
| 2002/0116463 A1 | 8/2002 | Hart | |
| 2002/0120748 A1 | 8/2002 | Schiavone et al. | |
| 2002/0143871 A1 | 10/2002 | Meyer et al. | |
| 2002/0162025 A1 | 10/2002 | Sutton | |
| 2002/0169954 A1 | 11/2002 | Bandini et al. | |
| 2002/0188689 A1 | 12/2002 | Michael | |
| 2002/0199095 A1 | 12/2002 | Bandini | |
| 2003/0009526 A1 | 1/2003 | Bellegarda et al. | |
| 2003/0023692 A1 | 1/2003 | Moroo | |
| 2003/0023736 A1 | 1/2003 | Abkemeier | |
| 2003/0041126 A1 | 2/2003 | Buford et al. | |
| 2003/0041280 A1 | 2/2003 | Malcolm et al. | |
| 2003/0046421 A1 | 3/2003 | Horvitz et al. | |
| 2003/0069933 A1 | 4/2003 | Lim | |
| 2003/0083862 A1 | 5/2003 | Hu et al. | |
| 2003/0086543 A1 | 5/2003 | Raymond | |
| 2003/0105827 A1 | 6/2003 | Tan | |
| 2003/0115485 A1 | 6/2003 | Miliken | |
| 2003/0120651 A1 | 6/2003 | Bernstein et al. | |
| 2003/0126136 A1 | 7/2003 | Omoigui | |
| 2003/0149726 A1 | 8/2003 | Spear | |
| 2003/0154254 A1 | 8/2003 | Awasthi | |
| 2003/0158725 A1 | 8/2003 | Woods | |
| 2003/0158903 A1 | 8/2003 | Rohall et al. | |
| 2003/0167311 A1 | 9/2003 | Kirsch | |
| 2003/0195937 A1 | 10/2003 | Kircher, Jr. et al. | |
| 2003/0204569 A1 | 10/2003 | Andrews et al. | |
| 2003/0229672 A1 | 12/2003 | Kohn | |
| 2003/0233418 A1 | 12/2003 | Goldman | |
| 2004/0003283 A1 | 1/2004 | Goodman et al. | |
| 2004/0008666 A1 | 1/2004 | Hardjono | |
| 2004/0015554 A1 | 1/2004 | Wilson | |
| 2004/0024639 A1 | 2/2004 | Goldman | |
| 2004/0030776 A1 | 2/2004 | Cantrell et al. | |
| 2004/0059697 A1 | 3/2004 | Forman | |
| 2004/0059786 A1 | 3/2004 | Caughey | |

(56) References Cited

U.S. PATENT DOCUMENTS

| | | | |
|---|---|---|---|
| 2004/0083270 A1 | 4/2004 | Heckerman et al. | |
| 2004/0107190 A1 | 6/2004 | Gilmour et al. | |
| 2004/0117451 A1 | 6/2004 | Chung | |
| 2004/0148330 A1 | 7/2004 | Alspector et al. | |
| 2004/0158554 A1 | 8/2004 | Trottman | |
| 2004/0162795 A1 | 8/2004 | Dougherty et al. | |
| 2004/0167964 A1 | 8/2004 | Rounthwaite et al. | |
| 2004/0167968 A1 | 8/2004 | Wilson | |
| 2004/0177120 A1 | 9/2004 | Kirsch | |
| 2004/0215963 A1 | 10/2004 | Kaplan | |
| 2005/0055410 A1 | 3/2005 | Landsman et al. | |
| 2005/0060643 A1 | 3/2005 | Glass et al. | |
| 2005/0080855 A1 | 4/2005 | Murray | |
| 2005/0081059 A1 | 4/2005 | Bandini et al. | |
| 2005/0091319 A1* | 4/2005 | Kirsch | H04L 12/58 709/206 |
| 2005/0125667 A1 | 6/2005 | Sullivan et al. | |
| 2005/0172213 A1 | 8/2005 | Ralston et al. | |
| 2005/0198160 A1 | 9/2005 | Shannon et al. | |
| 2005/0198289 A1 | 9/2005 | Prakash | |
| 2005/0228996 A1* | 10/2005 | Mayer | H04L 12/58 713/170 |
| 2005/0262208 A1* | 11/2005 | Haviv | G06Q 10/107 709/206 |
| 2006/0010217 A1 | 1/2006 | Sood | |
| 2006/0015563 A1* | 1/2006 | Judge | G06Q 10/107 709/206 |
| 2006/0031346 A1 | 2/2006 | Zheng et al. | |
| 2006/0036693 A1* | 2/2006 | Hulten | H04L 51/12 709/206 |
| 2006/0095404 A1* | 5/2006 | Adelman | G06F 17/30867 |
| 2006/0095521 A1 | 5/2006 | Patinkin | |
| 2006/0129644 A1 | 6/2006 | Owen et al. | |
| 2006/0168006 A1 | 7/2006 | Shannon et al. | |
| 2006/0168019 A1 | 7/2006 | Levy | |
| 2006/0235934 A1 | 10/2006 | Wilson | |
| 2006/0282888 A1 | 12/2006 | Bandini et al. | |
| 2007/0005564 A1 | 1/2007 | Zehner | |
| 2007/0027992 A1* | 2/2007 | Judge | G06Q 10/107 709/227 |
| 2007/0124578 A1 | 5/2007 | Paya et al. | |
| 2007/0143432 A1 | 6/2007 | Klos et al. | |
| 2008/0021890 A1* | 1/2008 | Adelman | G06F 17/30867 |
| 2008/0021969 A1 | 1/2008 | Oliver et al. | |
| 2008/0276318 A1 | 11/2008 | Leung et al. | |
| 2008/0301139 A1 | 12/2008 | Wang et al. | |
| 2008/0301281 A1 | 12/2008 | Wang et al. | |
| 2009/0063371 A1 | 3/2009 | Lin | |
| 2009/0064323 A1* | 3/2009 | Lin | H04L 51/12 726/22 |
| 2009/0110233 A1 | 4/2009 | Lu et al. | |
| 2009/0157708 A1* | 6/2009 | Bandini | H04L 12/585 |
| 2009/0220166 A1* | 9/2009 | Choi | G06K 9/38 382/260 |
| 2009/0262741 A1 | 10/2009 | Jungck et al. | |
| 2009/0313333 A1* | 12/2009 | Fanebost | G06Q 10/107 709/206 |
| 2010/0017487 A1 | 1/2010 | Patinkin | |
| 2010/0017488 A1 | 1/2010 | Oliver et al. | |
| 2010/0030578 A1* | 2/2010 | Siddique | G06Q 10/0637 705/3 |
| 2010/0161537 A1 | 6/2010 | Liu et al. | |
| 2010/0287246 A1 | 11/2010 | Klos et al. | |
| 2010/0318614 A1 | 12/2010 | Sager et al. | |
| 2011/0184976 A1 | 7/2011 | Wilson | |
| 2011/0191423 A1* | 8/2011 | Krasser | G06F 21/552 709/206 |
| 2011/0225244 A1* | 9/2011 | Levow | G06Q 10/107 709/206 |
| 2011/0265016 A1 | 10/2011 | Koopman | |
| 2011/0296524 A1 | 12/2011 | Hines et al. | |
| 2012/0131118 A1 | 5/2012 | Oliver et al. | |
| 2012/0131119 A1 | 5/2012 | Oliver et al. | |
| 2012/0166458 A1 | 6/2012 | Laudanski et al. | |
| 2012/0215892 A1 | 8/2012 | Wanser et al. | |
| 2013/0064286 A1* | 3/2013 | Karlsson | H04N 21/23439 375/240.02 |
| 2013/0173562 A1 | 7/2013 | Alspector et al. | |
| 2013/0215116 A1 | 8/2013 | Siddique et al. | |
| 2013/0275463 A1 | 10/2013 | Wilson | |
| 2013/0291060 A1* | 10/2013 | Moore | G06F 21/6245 726/1 |
| 2013/0318108 A1 | 11/2013 | Oliver | |
| 2014/0129655 A1 | 5/2014 | Oliver | |
| 2015/0213131 A1 | 7/2015 | Styler et al. | |
| 2016/0078124 A1 | 3/2016 | Wilson | |
| 2016/0205050 A1 | 7/2016 | Oliver et al. | |
| 2016/0210602 A1* | 7/2016 | Siddique | G06Q 20/0453 |
| 2017/0289082 A1 | 10/2017 | Shen | |

OTHER PUBLICATIONS

U.S. Appl. No. 15/074,788 Office Action dated Nov. 22, 2017.
"Active SMTP White Paper," ESCOM Corp. (author unknown), 2000, 11pp.
"Digital Signature," http://www.cnet.com/Resources/Info/Glossary/Terms/digitalsignature.html last accessed Nov. 15, 2006.
"Hash Function," http://en.wikipedia.org/wiki/Hash_value, last accessed Nov. 15, 2006.
"Majordomo FAQ," Oct. 20, 2001.
Agrawal et al., "Controlling Spam Emails at the Routers," IEEE 2005.
Anon, "Challenge Messages," Mailblocks, http://supportmailblocks.com/tab_howto/Validation/detail_privacy_challenge.asp, Apr. 18, 2003.
Anon, "Cloudmark, Different Approaches to Spamfighting," Whitepaper, Version 1.0, Nov. 2002.
Anon, "Correspondence Negotiation Protocol," http://www.cs.sfu.ca/~cameron/CNP.html, Mar. 17, 2003.
Anon, "ChoiceMail FAQ," DiGiPortal Creating Order From Chaos, Support-Frequently Asked Questions, http://www.digiportal.com/support/choicemail/faq.html, Jul. 2002.
Anon, "DM" Strategies Making a Living on Opt-In Email Marketing, Interactive PR & Marketing News, Feb. 19, 1999, vol. 6, Issue 4.
Anon, "Giant Company Software Announces Full Integrated AOL Support for its Popular Spam Inspector Anti-Spam Software," Giant Company Software, Inc., Nov. 15, 2002.
Anon, "How Challenge/Response Works," http://about.mailblocks.com/challenge.html, Apr. 1, 2003.
Anon, "Project: Vipul's Razor: Summary," http://sourceforge.net/projects/razor, Jan. 12, 2002.
Anon, "Tagged Message Delivery Agent (TMDA)," http://tmda.net/index.html, Jul. 25, 2002.
Anon, "The Lifecycle of Spam," PC Magazine, Feb. 25, 2003, pp. 74-97.
Balvanz, Jeff et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.
Byrne, Julian "My Spamblock," Google Groups Thread, Jan. 19, 1997.
Cranor, Lorrie et al., "Spam!," Communications of the ACM, vol. 41, Issue 8, pp. 74-83, Aug. 1998.
Dwork, Cynthia et al., "Pricing via Processing or Combating Junk Mail," CRYPTO '92, Springer-Verlag LNCS 740, pp. 139-147, 1992.
Gabrilovich et al., "The Homograph Attack," Communications of the ACM, 45 (2):128, Feb. 2002.
Georgantopoulous, Bryan "MScin Speech and Language Processing Dissertation: Automatic Summarizing Based on Sentence Extraction: A Statistical Approach," Department of Linguistics, University of Edinburgh, http://cgi.di.uoa.gr/~byron/msc.html, Apr. 21, 2001.
Gomes, Luiz et al., "Characterizing a Spam Traffic," in the Proc. of the 4th ACM SIGCOMM Conference on Internet Measurement, Sicily, Italy, pp. 356-369, 2004.

(56) References Cited

OTHER PUBLICATIONS

Guilmette, Ronald F., "To Mung or Not to Mung," Google Groups Thread, Jul. 24, 1997.
Hoffman, Paul and Crocker, Dave "Unsolicited Bulk Email: Mechanisms for Control" Internet Mail Consortium Report: UBE-SOL, IMCR-008, revised May 4, 1998.
Jung, Jaeyeon et al., "An Empirical Study of Spam Traffic and the Use of DNS Black Lists," IMC'04, Taormina, Sicily, Italy, Oct. 25-27, 2004.
Kolathur, Satheesh and Subramanian, Subha "Spam Filter, A Collaborative Method of Eliminating Spam," White paper, published Dec. 8, 2000 http://www.cs.uh.edu/~kolarthur/Paper.htm.
Langberg, Mike "Spam Foe Needs Filter of Himself," Email Thread dtd. Apr. 5, 2003.
Lie, D.H., "Sumatra: A System for Automatic Summary Generation," http://www.carptechnologies.nl/SumatraTWLT14paper/SumatraTWLT14.html, Oct. 1999.
Mastaler, Jason "Tagged Message Delivery Agent (TMDA)," TDMA Homepage, 2003.
Maxwell, Rebecca, "Inxight Summarizer creates Document Outlines," Jun. 17, 1999, www.itworldcanada.com.
McCullagh, Declan "In-Boxes that Fight Back," News.com, May 19, 2003.
Prakash, Vipul Ved "Razor-agents 2.22," http://razor.sourceforge.net, Aug. 18, 2000.
Skoll, David F., "How to Make Sure a Human is Sending You Mail," Google Groups Thread, Nov. 17, 1996.
Spamarrest, The Product, How it Works, http://spamarrest.com/products/howitworks.jsp, Aug. 2, 2002.
SpamAssassin, "Welcome to SpamAssassin," http://spamassassin.org, Jan. 23, 2003.
Templeton, Brad "Viking-12 Junk E-Mail Blocker," (believed to have last been updated Jul. 15, 2003).
Von Ahn, Luis et al., "Telling Humans and Computers Apart (Automatically) or How Lazy Cryptographers do AI," Communications to the ACM, Feb. 2004.
Weinstein, Lauren "Spam Wars," Communications of the ACM, vol. 46, Issue 8, p. 136, Aug. 2003.
PCT Application No. PCT/US04/05172 International Search Report and Written Opinion dated Dec. 7, 2004, 9 pages.
U.S. Appl. No. 11/903,413 Office Action dated Oct. 27, 2009.
U.S. Appl. No. 13/360,971 Office Action dated Aug. 13, 2013.
U.S. Appl. No. 14/152,812 Office Action dated May 8, 2015.
U.S. Appl. No. 15/074,788 Office Action dated Nov. 4, 2016.
U.S. Appl. No. 10/371,987 Final Office Action dated Jun. 27, 2008.
U.S. Appl. No. 10/371,987 Office Action dated Nov. 28, 2007.
U.S. Appl. No. 10/371,987 Final Office Action dated Jul. 6, 2007.
U.S. Appl. No. 10/371,987 Office Action dated Jan. 12, 2007.
U.S. Appl. No. 10/371,987 Final Office Action dated Aug. 10, 2006.
U.S. Appl. No. 10/371,987 Office Action dated Nov. 30, 2005.
U.S. Appl. No. 10/371,987 Final Office Action dated Jun. 6, 2005.
U.S. Appl. No. 10/371,987 Office Action dated Sep. 30, 2004.
U.S. Appl. No. 10/616,703 Office Action dated Nov. 28, 2007.
U.S. Appl. No. 10/616,703 Final Office Action dated Sep. 19, 2007.
U.S. Appl. No. 10/616,703 Office Action dated Apr. 9, 2007.
U.S. Appl. No. 11/455,037 Final Office Action dated Feb. 15, 2012.
U.S. Appl. No. 11/455,037 Office Action dated Oct. 28, 2011.
U.S. Appl. No. 11/455,037 Final Office Action dated Jan. 18, 2008.
U.S. Appl. No. 11/455,037 Office Action dated Jul. 17, 2007.
U.S. Appl. No. 11/455,037 Final Office Action dated Feb. 13, 2007.
U.S. Appl. No. 11/455,037 Office Action dated Oct. 20, 2006.
U.S. Appl. No. 11/926,819 Final Office Action dated Mar. 5, 2010.
U.S. Appl. No. 11/926,819 Office Action dated Jun. 25, 2009.
U.S. Appl. No. 11/927,497 Office Action dated Sep. 4, 2008.
U.S. Appl. No. 12/502,189 Final Office Action dated Aug. 2, 2011.
U.S. Appl. No. 12/502,189 Office Action dated Aug. 17, 2010.
U.S. Appl. No. 13/015,526 Office Action dated Aug. 10, 2012.
U.S. Appl. No. 13/361,659 Final Office Action dated Jul. 17, 2012.
U.S. Appl. No. 13/361,659 Office Action dated Mar. 16, 2012.
U.S. Appl. No. 13/912,055 Final Office Action dated Mar. 3, 2015.
U.S. Appl. No. 13/912,055 Office Action dated Nov. 7, 2014.
U.S. Appl. No. 13/913,413 Office Action dated May 13, 2014.
U.S. Appl. No. 14/938,573 Office Action dated Apr. 8, 2016.

\* cited by examiner

USING DISTINGUISHING PROPERTIES TO CLASSIFY MESSAGES

CROSS REFERENCE TO RELATED APPLICATIONS

The present application is a continuation and claims the priority benefit of U.S. patent application Ser. No. 14/938,573 filed Nov. 11, 2015, now U.S. Pat. No. 9,524,334, which is a continuation and claims the priority benefit of U.S. patent application Ser. No. 13/912,055 filed Jun. 6, 2013, now U.S. Pat. No. 9,189,516, which is a continuation and claims the priority benefit of Ser. No. 13/015,526 filed Jan. 27, 2011, now U.S. Pat. No. 8,484,301, which is a continuation and claims the priority benefit of U.S. patent application Ser. No. 11/926,819 filed Oct. 29, 2007, now U.S. Pat. No. 7,882,189, which is a continuation and claims the priority benefit of U.S. patent application Ser. No. 10/371,987 filed Feb. 20, 2003, now U.S. Pat. No. 8,266,215, the disclosures of which are incorporated herein by reference.

FIELD OF THE INVENTION

The present invention relates generally to message classification. More specifically, a system and method for classifying messages that are junk email messages (spam) are disclosed.

BACKGROUND OF THE INVENTION

People have become increasingly dependent on email for their daily communication. Email is popular because it is fast, easy, and has little incremental cost. Unfortunately, these advantages of email are also exploited by marketers who regularly send out large amounts of unsolicited junk email (also referred to as "spam"). Spam messages are a nuisance for email users. They clog people's email box, waste system resources, often promote distasteful subjects, and sometimes sponsor outright scams There have been efforts to block spam using spam-blocking software in a collaborative environment where users contribute to a common spam knowledge base. For privacy and efficiency reasons, the spam-blocking software generally identifies spam messages by using a signature generated based on the content of the message. A relatively straightforward scheme to generate a signature is to first remove leading and trailing blank lines then compute a checksum on the remaining message body. However, spam senders (also referred to as "spammers") have been able to get around this scheme by embedding variations—often as random strings—in the messages so that the messages sent are not identical and generate different signatures.

Another spam-blocking mechanism is to remove words that are not found in the dictionary as well as leading and trailing blank lines, and then compute the checksum on the remaining message body. However, spammers have been able to circumvent this scheme by adding random dictionary words in the text. These superfluous words are sometimes added as white text on a white background, so that they are invisible to the readers but nevertheless confusing to the spam-blocking software.

The existing spam-blocking mechanisms have their limitations. Once the spammers learn how the signatures for the messages are generated, they can alter their message generation software to overcome the blocking mechanism. It would be desirable to have a way to identify messages that cannot be easily overcome even if the identification scheme is known. It would also be useful if any antidote to the identification scheme were expensive to implement or would incur significant runtime costs.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved system and method for classifying mail messages are disclosed. In one embodiment, the distinguishing properties in a mail message are located and used to produce one or more signatures. The signatures for junk messages are stored in a database and used to classify these messages. Preferably, the distinguishing properties include some type of contact information.

Figure 1:
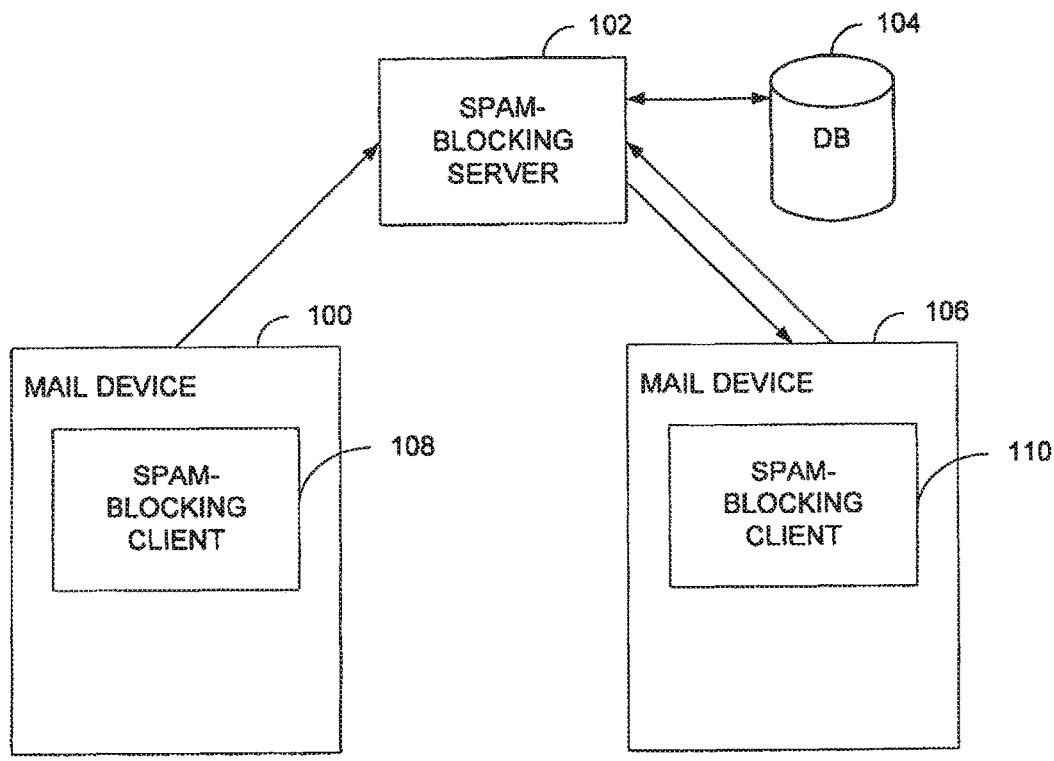
FIG. 1 is a block diagram illustrating a spam message classification network according to one embodiment of the present invention.

FIG. 1 is a block diagram illustrating a spam message classification network according to one embodiment of the present invention. The system allows users in the network to collaborate and build up a knowledge base of known spam messages, and uses this knowledge to block spam messages. A spam message is first received by a mail device 100. The mail device may be a mail server, a personal computer running a mail client, or any other appropriate device used to receive mail messages. A user reads the message and determines whether it is spam.

If the message is determined to be spam, the spam-blocking client 108 on the mail device provides some indicia for identifying the message. In one embodiment, the indicia include one or more signatures (also referred to as thumb-prints) based on a set of distinguishing properties extracted from the message. The signatures are sent to a spam-blocking server 102, which stores the signatures in a database 104. Different types of databases are used in various embodiments, including commercial database products such as Oracle databases, files, or any other appropriate storage that allow data to be stored and retrieved. In one embodiment, the database keeps track of the number of times a signature has been identified as spam by other users of the system. The database may be located on the spam-blocking server device, on a network accessible by server 102, or on a network accessible by the mail devices. In some embodiments, the database is cached on the mail devices and updated periodically.

When another mail device 106 receives the same spam message, before it is displayed to the user, spam-blocking client software 110 generates one or more signatures for the message, and sends the signatures along with any other query information to the spam-blocking server. The spam-blocking server looks up the signatures in the database, and replies with information regarding the signatures. The information in the reply helps mail device 106 determine whether the message is spam.

Mail device 106 may be configured to use information from the spam-blocking server to determine whether the message is spam in different ways. For example, the number of times the message was classified by other users as spam may be used. If the number of times exceeds some preset threshold, the mail device processes the message as spam. The number and types of matching signatures and the effect of one or more matches may also be configured. For example, the message may be considered spam if some of the signatures in the signature set are found in the database, or the message may be determined to be spam only if all the signatures are found in the database.

Spammers generally have some motives for sending spam messages. Although spam messages come in all kinds of forms and contain different types of information, nearly all of them contain some distinguishing properties (also referred to as essential information) for helping the senders fulfill their goals. For example, in order for the spammer to ever make money from a recipient, there must be some way for the recipient to contact the spammer. Thus, some type of contact information is included in most spam, whether in the form of a phone number, an address, or a URL. Alternatively, certain types of instructions may be included. These distinguishing properties, such as contact information, instructions for performing certain tasks, stock ticker symbols, names of products or people, or any other information essential for the message, are extracted and used to identify messages. Since information that is not distinguishing is discarded, it is harder for the spammers to alter their message generation scheme to evade detection.

It is advantageous that messages other than those sent by the spammer are not likely to include the same contact information or instructions. Therefore, if suitable distinguishing properties are identified, the risk of a false positive classification as spam can be diminished.

In some embodiments, spam-blocking server 102 acts as a gateway for messages. The server includes many of the same functions as the spam-blocking client. An incoming message is received by the server. The server uses the distinguishing properties in the messages to identify the messages, and then processes the messages accordingly.

Figure 2:
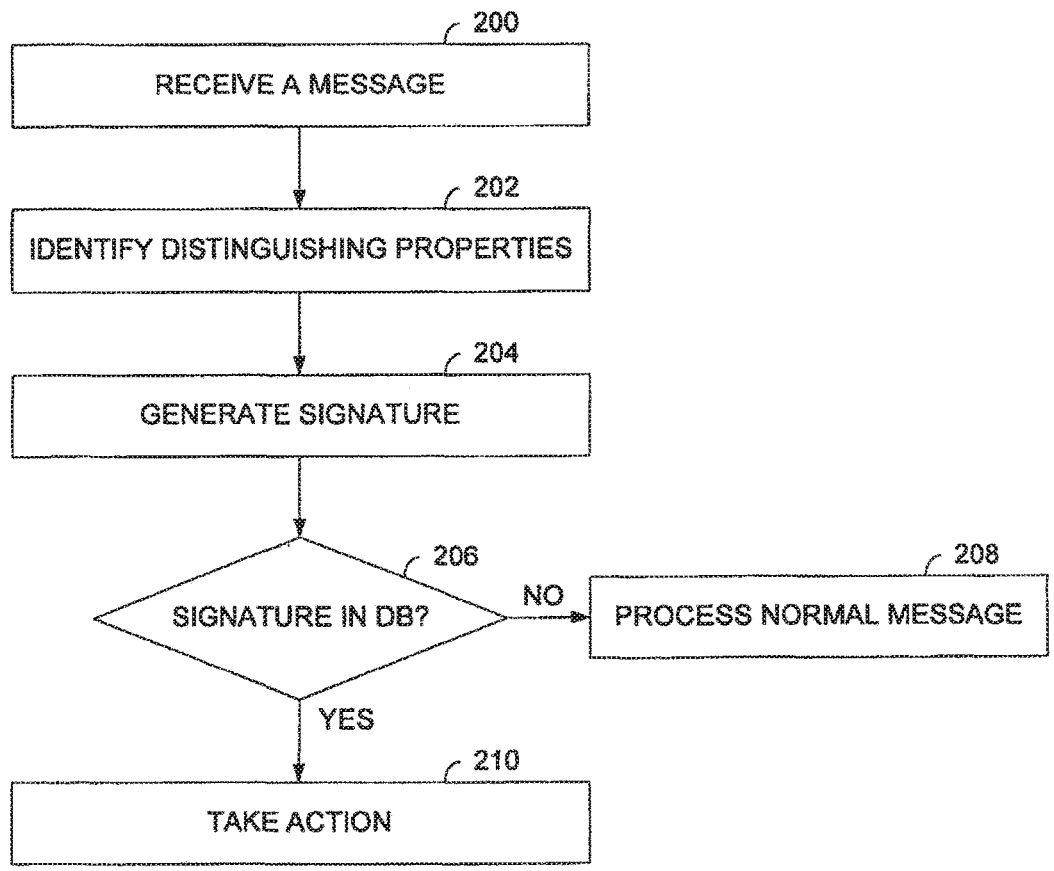
FIG. 2 is a flowchart illustrating how to extract the distinguishing properties and use them to identify a message, according to one embodiment of the present invention.

FIG. 2 is a flowchart illustrating how to extract the distinguishing properties and use them to identify a message, according to one embodiment of the present invention. First, a message is received (200). The distinguishing properties in the message are identified (202), and one or more signatures are generated based on the distinguishing properties (204). The signatures are looked up in a database (206). If the signatures are not found in the database, then the system proceeds to process the message as a normal message, delivering the message or displaying it when appropriate (208). Otherwise, if matching signatures are found in the database, some appropriate action is taken accordingly (210). In an embodiment where the process takes place on a mail client, the action includes classifying the message as spam and moving it to an appropriate junk folder. In an embodiment where the process takes place on a mail server, the action includes quarantining the message so it is recoverable by the administrator or the user.

Sometimes, a spam message is delivered to the user's inbox because an insufficient number of signature matches are found. This may happen the first time a spam message with a distinguishing property is sent, when the message is yet to be classified as spam by a sufficient number of users on the network, or when not enough variants of the message have been identified. The user who received the message can then make a contribution to the database by indicating that the message is spam. In one embodiment, the mail client software includes a "junk" button in its user interface. The user can click on this button to indicate that a message is junk. Without further action from the user, the software automatically extracts information from the message, submits the information to the server, and deletes the message from the user's inbox. In some embodiments, the mail client software also updates the user's configurations accordingly. For instance, the software may add the sender's address to a blacklist. The blacklist is a list of addresses used for blocking messages. Once an address is included in the blacklist, future messages from that address are automatically blocked.

Figure 3:
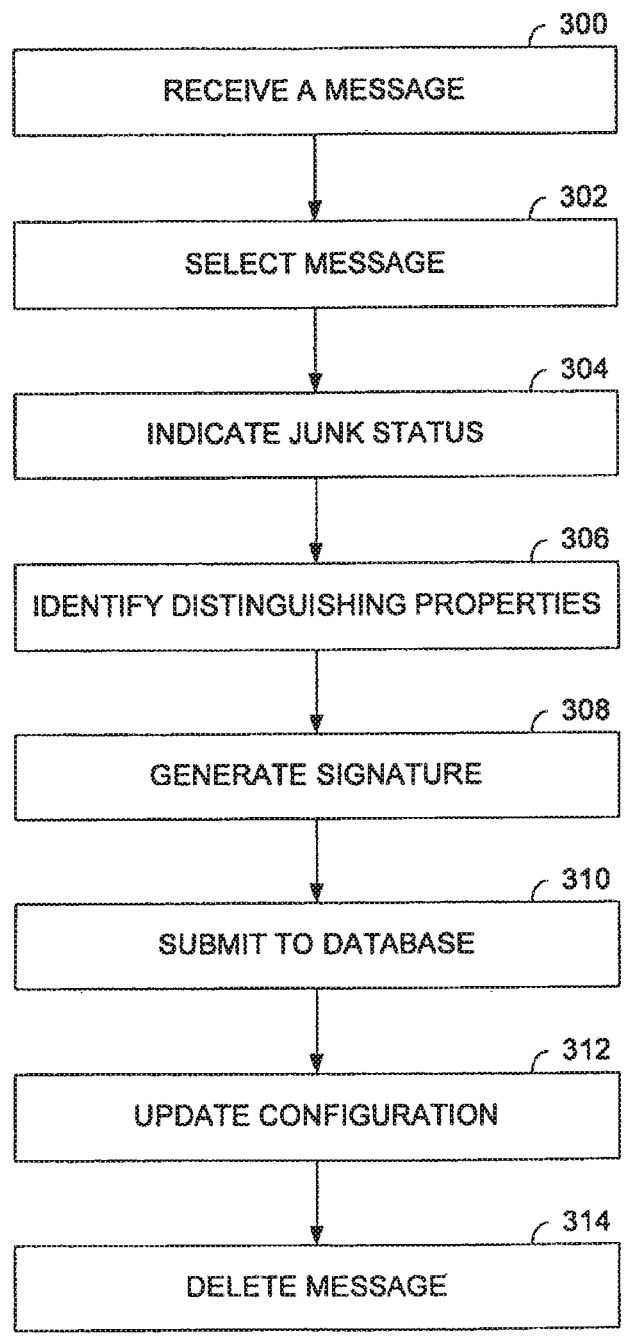
FIG. 3 is a flowchart illustrating how a user classifies a message as spam according to one embodiment of the present invention.

FIG. 3 is a flowchart illustrating how a user classifies a message as spam according to one embodiment of the present invention. A spam message is received by the user (300). The user selects the message (302), and indicates that the message is junk by clicking on an appropriate button or some other appropriate means (304). The software identifies the distinguishing properties in the message (306), and generates a set of signatures based on the distinguishing properties (308). The signatures are then submitted to the database (310). Thus, matching signatures can be found in the database for messages that have similar distinguishing properties. In some embodiments, the mail client software then updates the user's configurations based on the classification (312). In some embodiments, the sender's address is added to a blacklist. The message is then deleted from the user's inbox (314).

Figure 4:
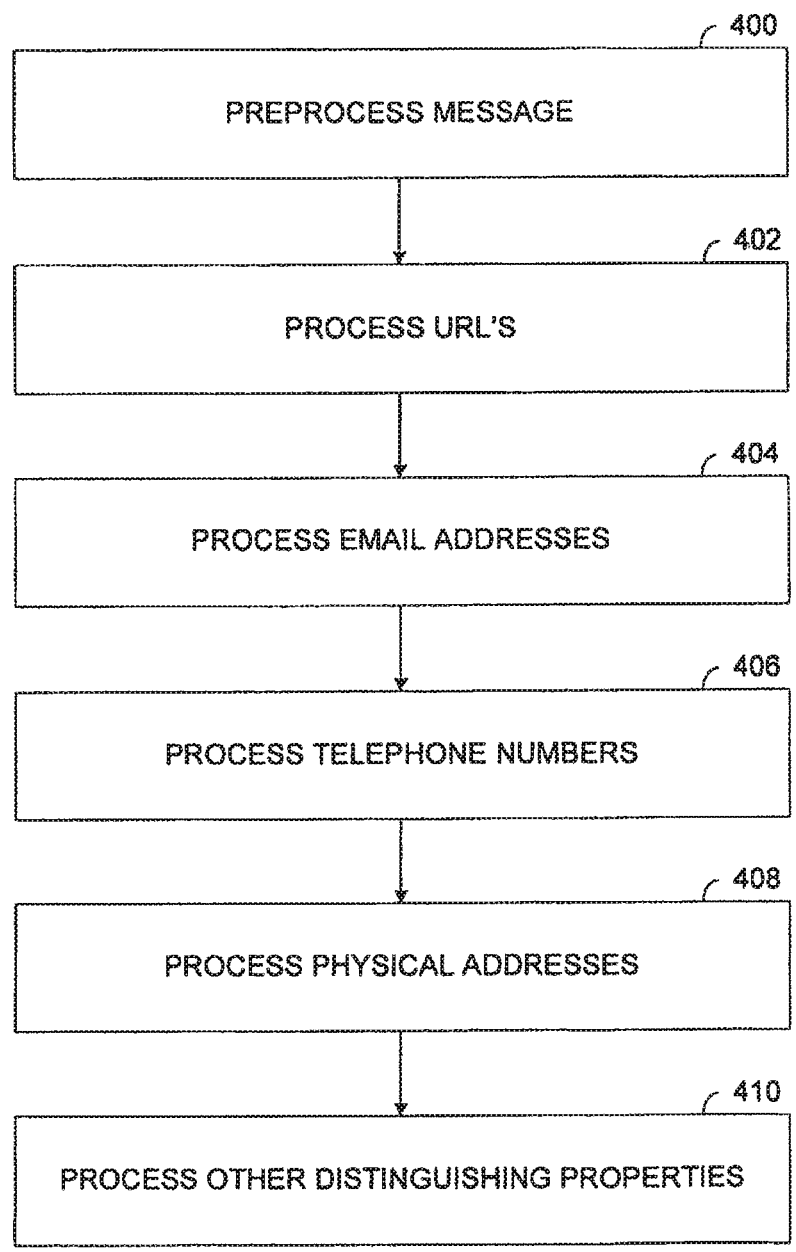
FIG. 4 is a flowchart illustrating how the distinguishing properties are identified according to one embodiment of the present invention.

FIG. 4 is a flowchart illustrating how the distinguishing properties are identified according to one embodiment of the present invention. Since most spammers would like to be contacted somehow, the messages often include some sort of contact information, such as universal resource locators (URL's), email addresses, Internet protocol (IP) addresses, telephone numbers, as well as physical mailing addresses. In this embodiment, the distinguishing properties of the message include contact information.

The message is preprocessed to remove some of the non-essential information (400), such as spaces, carriage returns, tabs, blank lines, punctuations, and certain HTML tags (color, font, etc.).

Distinguishing properties are then identified and extracted from the message. Since spammers often randomly change the variable portions of URL's and email addresses to evade detection, the part that is harder to change—the domain name—is included in the distinguishing properties while the variable portions are ignored. The domain name is harder to change because a fee must be paid to obtain a valid domain name, making it less likely that any spammer would register for a large number of domain names just to evade detection. The software scans the preprocessed message to identify URL's in the text, and extracts the domain names from the URL's (402). It also processes the message to identify email addresses in the text and extracts the domain names embedded in the email addresses (404).

Telephone numbers are also identified (406). After preprocessing, phone numbers often appear as ten or eleven digits of numbers, with optional parentheses around the first three digits, and optional dashes and spaces between the numbers. The numbers are identified and added to the distinguishing properties. Physical addresses are also identified using heuristics well known to those skilled in the art (408). Some junk messages may contain other distinguishing properties such as date and location of events, stock ticker symbols, etc. In this embodiment, these other distinguishing properties are also identified (410). It should be noted that the processing steps are performed in different order in other embodiments. In some embodiments, a subset of the processing steps is performed.

Figure 5:
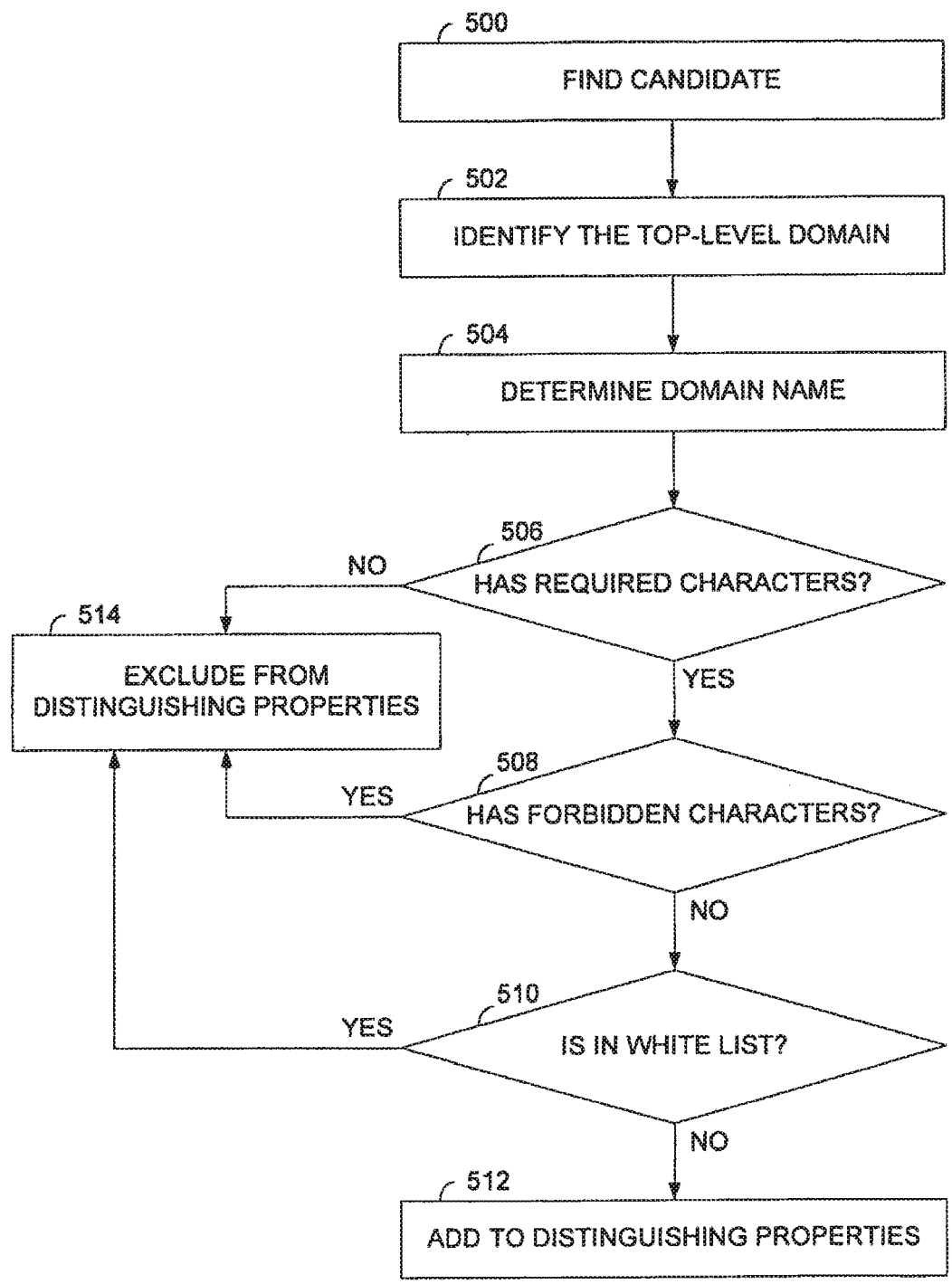
FIG. 5 is a flowchart illustrating the details of the email address identification step shown in FIG. 4.

FIG. 5 is a flowchart illustrating the details of the email address identification step shown in FIG. 4. First, the message is scanned to find candidate sections that include top-level domain names (500). The top-level domain refers to the last section of an address, such as .com, .net, .uk, etc. An email address includes multiple fields separated by periods. The top-level domain determines which fields form the actual domain name, according to well-known standards. For example, the address user1@server1.mailfrontier.com has a domain name that includes two fields (mailfrontier.com), while as user2@server1.mailfrontier.co.uk has a domain name that includes three fields (mailfrontier.co.uk). Thus, the top-level domain in a candidate section is identified (502), and the domain name is determined based on the top-level domain (504).

The presence of any required characters (such as @) is checked to determine whether the address is a valid email addresses (506). If the address does not include the require characters, it is invalid and its domain name should be excluded from the distinguishing properties (514). If the required characters are included in the address, any forbidden characters (such as commas and spaces) in the address are also checked (508). If the address includes such forbidden characters, it is invalid and its domain name may be excluded from the distinguishing properties (514).

Sometimes, spammers embed decoy addresses—fake addresses that have well-known domain names—in the messages, attempting to confuse the spam-blocking software. In some embodiments, the decoy addresses are not included in the distinguishing properties. To exclude decoy addresses, an address is checked against a white list of well-known domains (510), and is excluded from the distinguishing properties if a match is found (514). If the address is not found in the white list, it belongs to the distinguishing properties (512).

In some embodiments, a similar process is used to identify URL's. The domain names of the URL's are extracted and included in the distinguishing properties, and decoy URL's are discarded. Sometimes, spammers use numerical IP addresses to hide their domain names. By searching through the message for any URL that has the form http://x.x.x.x where the x's are integers between 0-255, these numerical IP addresses are identified and included in the distinguishing properties. More crafty spammers sometimes use obscure forms of URL's to evade detection. For example, binary numbers or a single 32 bit number can be used instead of the standard dotted notation. Using methods well-known to those skilled in the art, URL's in obscure forms can be identified and included in the distinguishing properties. In some embodiments, physical addresses, events, and stock quotes are also identified.

Once the distinguishing properties have been identified, the system generates one or more signatures based on the distinguishing properties and sends the signatures to the database. The signatures can be generated using a variety of methods, including compression, expansion, checksum, or any other appropriate method. In some embodiments, the data in the distinguishing properties is used directly as signatures without using any transformation. In some embodiments, a hash function is used to produce the signatures. Various hash functions are used in different embodiments, including MD5 and SHA. In some embodiments, the hash function is separately applied to every property in the set of distinguishing properties to produce a plurality of signatures. In one embodiment, any of the distinguishing properties must meet certain minimum byte requirement for it to generate a corresponding signature. Any property that has fewer than a predefined number of bytes is discarded to lower the probability of signature collisions.

The generated signatures are transferred and stored in the database. In one embodiment, the signatures are formatted and transferred using extensible markup language (XML). In some embodiments, the signatures are correlated and the relationships among them are also recorded in the database. For example, if signatures from different messages share a certain signature combination, other messages that include the same signature combination may be classified as spam automatically. In some embodiments, the number of times each signature has been sent to the database is updated.

Using signatures to identify a message gives the system greater flexibility and allows it to be more expandable. For example, the mail client software may only identify one type of distinguishing property in its first version. In later versions, new types of distinguishing properties are added. The system can be upgraded without requiring changes in the spam-blocking server and the database.

An improved system and method for classifying a message have been disclosed. The system identifies the distinguishing properties in an email message and generates one or more signatures based on the distinguishing properties. The signatures are stored in a database and used by spam-blocking software to effectively block spam messages.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for identifying spam messages, the method comprising:
   receiving a message over a communication network interface;
   receiving one or more indications from one or more user devices indicating that the message includes spam;
   executing instructions stored in memory, wherein execution of the instructions by a processor:
      scans the received electronic message to identify that the message includes one or more candidate distinguishing properties, wherein the scan further checks that required characters are present in at least one of the candidate distinguishing properties and that forbidden characters are not present in the at least one candidate distinguishing property,
      identifies that the received message is a spam message based on the one or more indications received from the one or more user devices indicating that the received message includes the spam, and
      generates a signature from the at least one candidate distinguishing property;
   storing the generated signature in a database storing a plurality of signatures each associated with the spam;
   receiving a subsequent message; and
   identifying that the subsequent message includes the spam based on a signature of the subsequent message matching the generated signature stored in the database.

2. The method of claim 1, further comprising placing the subsequent message in a spam folder based on the identification that the subsequent message includes the spam.

3. The method of claim 1, further comprising quarantining the subsequent message based on the identification that the subsequent message includes the spam.

4. The method of claim 1, wherein the at least one candidate distinguishing property includes at least one of an email address, a universal resource locator (URL), a domain name, an address, contact information, a stock ticker symbol, a task instruction, and an (IP) internet protocol address.

5. The method of claim 1, wherein generating a signature from the at least one candidate distinguishing property comprises applying a hash function to the at least one candidate distinguishing property.

6. The method of claim 1, wherein the one or more received indications from the one or more user devices are based on user input indicating that the message includes the spam.

7. The method of claim 1, wherein the scan does not detect presence of other required characters or detects a presence of forbidden characters in at least one other of the candidate distinguishing properties, and wherein the at least one other candidate distinguishing property is excluded from the database of distinguishing properties.

8. The method of claim 1, wherein the indication is further associated with a spam count that is incremented each time another indication identifies a message including the signature.

9. A non-transitory computer-readable storage medium having embodied thereon a program executable by a processor for performing a method for identifying spam messages, the method comprising:
   receiving a message over a communication network interface;
   receiving one or more indications from one or more user devices indicating that the message includes spam;
   scanning the received electronic message to identify that the message includes one or more candidate distinguishing properties, wherein the scan checks that required characters are present in at least one of the candidate distinguishing properties and that forbidden characters are not present in the at least one candidate distinguishing property,
   identifying that the received message is a spam message based on the one or more indications received from the one or more user devices indicating that the message includes the spam,
   generating a signature from the at least one candidate distinguishing property;
   storing the generated signature in a database storing a plurality of signatures each associated with the spam;
   receiving a subsequent message; and
   identifying that the subsequent message includes the spam based on a signature of the subsequent message matching the generated signature stored in the database.

10. The non-transitory computer-readable storage medium of claim 9, wherein the program further comprises instructions executable to place the subsequent message in a spam folder based on the identification that the subsequent message includes the spam.

11. The non-transitory computer-readable storage medium of claim 9, wherein the program further comprises instructions executable to quarantine the subsequent message based on the identification that the subsequent message includes the spam.

12. The non-transitory computer-readable storage medium of claim 9, wherein the at least one candidate distinguishing property includes at least one of an email address, a universal resource locator (URL), a domain name, an address, contact information, a stock ticker symbol, a task instruction, and an (IP) internet protocol address.

13. The non-transitory computer-readable storage medium of claim 9, wherein generating a signature from the at least one candidate distinguishing property comprises applying a hash function to the at least one candidate distinguishing property.

14. The non-transitory computer-readable storage medium of claim 9, wherein the one or more received indications from the one or more user devices are based on user input indicating that the message includes the spam.

15. The non-transitory computer-readable storage medium of claim 9, wherein the scan does not detect presence of other required characters or detects a presence of forbidden characters in at least one other of the candidate distinguishing properties, and wherein the at least one other candidate distinguishing property is excluded from the database of distinguishing properties.

16. The non-transitory computer-readable storage medium of claim 9, wherein the indication is further associated with a spam count that is incremented each time another indication identifies a message including the signature.

17. An apparatus for identifying spam messages, the apparatus comprising:
   a network interface that receives a message and one or more indications from one or more user devices indicating that message includes spam;
   a memory that stores a database of a plurality of signatures each associated with spam; and
   a processor executing instructions stored in memory, wherein execution of the instructions by the processor:
      scans the received electronic message to identify that the message includes one or more candidate distinguishing properties, wherein the scan checks that required characters are present in at least one of the candidate distinguishing properties and that forbidden characters are not present in the at least one of the candidate distinguishing property, identifies that the received message is a spam message based on the one or more indications received from the one or more user devices indicating that the message includes the spam, generates a signature from the at least one of the candidate distinguishing property, wherein the generated signature is stored in the database, and identifies that a subsequent message includes the spam based on a signature of the subsequent message matching the generated signature stored in the database.

18. The apparatus of claim 17, wherein the processor executes further instructions to place the subsequent message in a spam folder based on the identification that the subsequent message includes the spam.

19. The apparatus of claim 17, wherein the processor executes further instructions to quarantine the subsequent message based on the identification that the subsequent message includes the spam.

20. The apparatus of claim 17, wherein the at least one candidate distinguishing property includes at least one of an email address, a universal resource locator (URL), a domain name, an address, contact information, a stock ticker symbol, a task instruction, and an (IP) internet protocol address.

\* \* \* \* \*